Feb. 20, 1962     H. E. JACKSON ET AL     3,021,571

COUPLING FOR PLASTIC TUBES

Filed March 17, 1958

INVENTORS

ATTORNEY

United States Patent Office 3,021,571
Patented Feb. 20, 1962

3,021,571
COUPLING FOR PLASTIC TUBES
Harold Ernest Jackson, St. Maurice, and Trevor Frederick Moss, Newton Ferrers, England, assignors, by mesne assignments, to Imperial-Eastman Corporation, Chicago, Ill., a corporation of Illinois
Filed Mar. 17, 1958, Ser. No. 721,894
Claims priority, application Great Britain Mar. 29, 1957
3 Claims. (Cl. 18—56)

This invention relates to a method of providing the end part of a pipe or tube, made of deformable or flexible elastomeric material, with integral means for coupling the end part to another tube, which may or may not be of deformable or plastic material, or for fitting the end part in a supporting bracket or plate or other support. A tube provided with the coupling means according to the invention may be used as a liner for a lodgment or bracket, such a liner being intended to be used to secure a pipe or tube rigidly in a desired position in the lodgment or bracket.

The present invention provides a method of producing the end part of a tube, made of deformable or flexible plastic material, with integral means for coupling the end part to another tube or for fitting the end part in a supporting member, the said method consisting in deforming the tube so that it will be provided with a number of spaced indentations or grooves or corrugations and thus with a number of spaced outwardly-projecting circumferential protuberances or ribs on its outer surface.

The end part of the tube may be formed with a number of longitudinally-spaced inwardly-projecting annular indentations which provide between them a number of longitudinally-spaced outwardly-projecting annular ridges, the diameter of which is slightly greater than the undeformed part of the tube. This construction is particularly useful for connecting the plastic tube to another tube of plastic or other material. In this case, the corrugated end of the plastic tube to be connected is thrust into the end of the other tube in which latter it is thus firmly held.

One constructional form of the invention is hereinafter described, by way of example, with reference to the accompanying drawing, wherein.

Figure 1:
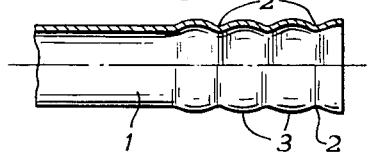
FIGURE 1 is an elevation partly in section of a plastic tube in which the end part of the tube is formed with a number of inwardly-projecting longitudinally-spaced annular grooves forming between them a number of outwardly-projecting ridges, the diameter of which is somewhat greater than that of the undeformed part of the tube.
Figure 2:
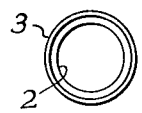
FIGURE 2 is an end view of the tube.

Referring first to FIGS. 1 and 2:

The end part of the tube 1, shown in FIGS. 1 and 2, is formed with a number of longitudinally-spaced, inwardly-extending annular circumferential indentations 2 between which there is a number of outwardly-projecting circumferential ridges 3, the diameter of which is slightly greater than that of the undeformed part of the plastic tube. As mentioned above, this construction is particularly useful for connecting the plastic tube to another tube of plastic or other material. In this case, the corrugated end of the plastic tube, to be connected, is thrust into the end of the other tube in which latter it is thus firmly held.

Figure 3:
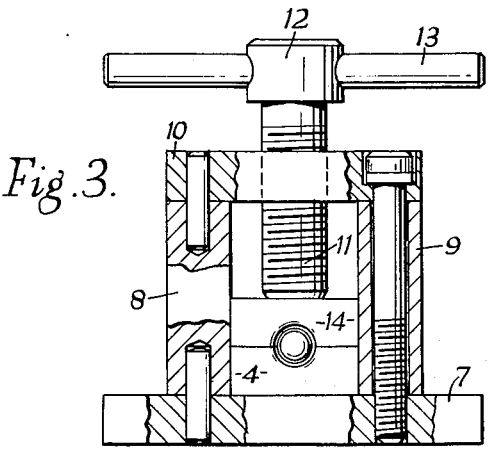
FIGURE 3 is an end view partly in section of a die block suitable for use in shaping the end part of the plastic tube shown in FIGURES 1 and 2.
Figure 4:
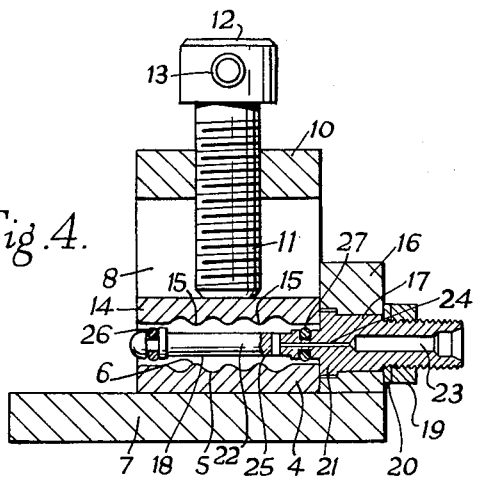
FIGURE 4 is a sectional elevation of the die block.

A convenient method of shaping the end part of the tube 1, shown in FIGS. 1 and 2 (which is formed with annular grooves 2), is to make use of a two-part die block as shown in FIGS. 3 and 4. This block comprises a lower die 4, the upper surface of which is formed with spaced semi-circular annular grooves 5 which thus leave between them a number of spaced semi-circular saw-tooth like ridges 6. The bottom die is arranged on a base plate 7 between two side blocks 8 and 9 which at their upper ends are connected by a bridge piece 10 through which a threaded pin 11 is screwed. Above the bridge piece, the pin has a head 12 in which an operating cross rod 13 is fitted. The lower end of the screw bears upon the upper surface of an upper die 14, the lower surface of which is formed exactly like the upper surface of the bottom die 4 and which, therefore, comprises a number of semi-circular axially-spaced saw-tooth like ridges 15. At one end of the die block, there is a vertical end piece 16 which serves to support a nozzle 18 in position between and concentrically of and spaced from the semi-circular ridged surfaces of said dies 4 and 14. One end of the nozzle 18 is formed with a shank 17 which extends through and is fitted in an opening in the end piece 16. The inner end portion of the shank 17 is formed with a lateral flange 21 and its outer end is threaded and projects externally of the end piece 16 to receive a nut 19 and washer 20 fitted therein, which holds the nozzle 18 firmly in position with said flange 21 arranged in a complemental recess in the end piece 16 adjacent to the dies.

The nozzle 18 is preferably in the form of a cylindrical nose piece 22 which extends from the flange 21 on the shank forwardly into the space between the upper and lower dies. Extending from the end of the shank 17 external of the die block, there is a passage 23, which at about the centre of length of the shank and within the width of the end piece 16, is connected to a fine diameter passage 24 which, in turn, terminates at the opposite end in a cross-passage 25 of slightly larger diameter. Near the free or outer end of the nose piece 22 of the nozzle, an O-sealing ring 26 is fitted in an annular groove formed in the nose and at the opposite or inner end of the nose, there is another O-sealing ring 27 which is fitted in a second annular groove formed in the nose piece adjacent to the shank 17.

When the die block 4–14 is to be used, the said screwed pin 11 is slackened and the end of the plastic tube (not shown) is thrust on to the nose piece of the nozzle so that the tube end fits against the above-mentioned flange 21 on the shank 17 of the nozzle. The protruding end of the shank is connected to a source of liquid under pressure, by which the liquid is forced through the two coaxial passages 23 and 24 in the nozzle and into the interior of the plastic tube through the said cross passage 25. The liquid thus exerts pressure on the internal surface of the plastic tube and forces the same into the annular grooves formed between the co-acting inner surfaces of the two dies 4 and 14 and, after a lapse of time, depending upon the composition of the plastic material, the circumferential indentations 2 and the ridges 3 become set in the end of the tube.

Having thus described the invention and the manner in which it its to be performed, it is manifest from the above description that the objects of the invention have been attained, and it is to be understood that the invention is to be limited only by the scope of the appended claims.

That which is claimed, as new and to be secured by Letters Patent, is:

1. A method of deforming a portion of a continuous length of open-ended tube made of a deformable elastomeric material to form external and lateral projections thereon adapted to couple or assist in coupling the tube to a member into which it is fitted, said method comprising holding a portion of said tube with a sealing grip at longitudinally spaced points between a nozzle insert into the tube and separable moulding members surrounding said tube to provide a space inside said tube and between said spaced gripping points, supplying a fluid under sufficient pressure from an outside source through the nozzle into the space between said gripping points and between said tube and nozzle to force the walls of the tube outwardly into engagement with the moulding surfaces of the separable moulding members, maintaining said fluid pressure for a period of time until the deformed area of the tube assumes permanently the shape conforming to and determined by the shape of the moulding surfaces, and then separating said moulding members and removing the tube from said nozzle.

2. A method according to claim 1, wherein the moulding surfaces are shaped to form alternating ridges and grooves on the end portion of the tube.

3. A method of deforming a section of a continuous length of open-ended tube made of a deformable elastomeric material to form corrugations in the form of ridges projecting externally and laterally from the said section, which method comprises fitting the section of the tube over a rigid elongated nozzle within separated separable moulding members having internal moulding surfaces to produce a series of corrugations of greater diameter than that of the non-deformed portion of the tube; moving said moulding members against the walls of said tube section to initially press the tube into fluid-tight sealing contact with two spaced-apart circumferential projecting elements on the nozzle while leaving a space within the tube surrounding the nozzle between the projecting elements; supplying fluid into the said space under sufficient pressure from a source outside of the assembly through said nozzle so as to deform the material of the tube and press the walls of the latter between the projecting elements against the moulding surfaces, while a fluid seal between the tube and the projecting elements is maintained; maintaining said fluid pressure for a period of time until the deformed area of the tube assumes permanently the shape conforming to and determined by the shape of the moulding surfaces; and then separating said moulding members and removing the end of the tube from said nozzle.

References Cited in the file of this patent

UNITED STATES PATENTS

| | | |
|---|---|---|
| 1,052,081 | Miltner | Feb. 4, 1913 |
| 1,802,538 | Rych | Apr. 28, 1931 |
| 1,861,296 | Braly | May 31, 1932 |
| 1,879,663 | Dreyer | Sept. 27, 1932 |
| 2,248,898 | Ross et al. | July 8, 1941 |
| 2,299,520 | Yant | Oct. 20, 1942 |
| 2,347,086 | Curtiss | Apr. 18, 1944 |
| 2,392,085 | Ferrel | Jan. 1, 1946 |
| 2,477,676 | Woodling | Aug. 2, 1949 |
| 2,616,129 | Burton | Nov. 4, 1952 |
| 2,779,279 | Maiwurm | Jan. 29, 1957 |
| 2,779,976 | Roberts et al. | Feb. 5, 1957 |

FOREIGN PATENTS

| | | |
|---|---|---|
| 801,888 | Germany | Jan. 25, 1951 |
| 470,052 | Italy | Mar. 18, 1952 |